United States Patent
Lu et al.

(10) Patent No.: US 11,428,139 B2
(45) Date of Patent: Aug. 30, 2022

(54) INTERNAL SWIRLER TUBE FOR EXHAUST CATALYST

(71) Applicant: Tenneco Automotive Operating Company Inc., Lake Forest, IL (US)

(72) Inventors: Meng-Huang Lu, Ann Arbor, MI (US); William Adams, Parma, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 47 days.

(21) Appl. No.: 17/116,619

(22) Filed: Dec. 9, 2020

(65) Prior Publication Data

US 2022/0178293 A1   Jun. 9, 2022

(51) Int. Cl.
| | |
|---|---|
| *F01N 3/28* | (2006.01) |
| *F01N 3/20* | (2006.01) |
| *B01D 53/94* | (2006.01) |
| *B01F 23/213* | (2022.01) |
| *B01F 25/313* | (2022.01) |

(Continued)

(52) U.S. Cl.
CPC ......... *F01N 3/2892* (2013.01); *B01D 53/944* (2013.01); *B01D 53/9418* (2013.01); *B01D 53/9431* (2013.01); *B01D 53/9436* (2013.01); *B01D 53/9495* (2013.01); *B01F 23/2132* (2022.01); *B01F 25/3131* (2022.01); *B01F 25/4315* (2022.01); *F01N 3/208* (2013.01); *F01N 3/2803* (2013.01); *B01D 2255/904* (2013.01); *B01F 25/4314* (2022.01); *B01F 2025/913* (2022.01); *F01N 2610/02* (2013.01);

(Continued)

(58) Field of Classification Search
CPC ......... F01N 2610/02; F01N 2610/1453; F01N 3/2892; F01N 3/2803; F01N 3/208; F01N 2900/1402; F01N 3/2066; B01D 53/9418; B01D 53/9431; B01D 53/9436; B01D 53/944; B01D 53/9495; B01D 2255/904; B01F 23/2132; B01F 25/3131; B01F 25/4315; B01F 25/4314; B01F 2025/913
USPC ............................................ 422/119; 60/324
See application file for complete search history.

(56) References Cited

U.S. PATENT DOCUMENTS

| | | |
|---|---|---|
| 7,328,572 B2 | 2/2008 | McKinley et al. |
| 8,869,518 B2 | 10/2014 | Yetkin et al. |

(Continued)

FOREIGN PATENT DOCUMENTS

| | | |
|---|---|---|
| DE | 112015001958 T5 | 1/2017 |
| WO | WO-2020097008 A1 | 5/2020 |

*Primary Examiner* — Devon C Kramer
*Assistant Examiner* — Kelsey L Stanek
(74) *Attorney, Agent, or Firm* — Harness, Dickey & Pierce, P.L.C.

(57) ABSTRACT

An exhaust system assembly including a catalyst housing, a catalyst core, and a swirler tube positioned inside the catalyst housing. The swirler tube has a plurality of openings that permit radial exhaust flow into an inner volume of the swirler tube from the catalyst housing. One end of the swirler tube has blades that extend inward and include oblique surfaces arranged at oblique angles relative to a centerline axis of the swirler tube. These blades induce a vortex in the exhaust gases exiting the first swirler tube end. The swirler tube is arranged inside the catalyst housing such that a sequential flow path is created where the exhaust gases flowing through the catalyst housing must first pass through the openings in the swirler tube and then by the blades at the first swirler tube end.

18 Claims, 7 Drawing Sheets

(51) Int. Cl.
  *B01F 25/431* (2022.01)
  *B01F 25/4314* (2022.01)
  *B01F 25/00* (2022.01)
(52) U.S. Cl.
  CPC .............. *F01N 2610/1453* (2013.01); *F01N 2900/1402* (2013.01)

(56) References Cited

U.S. PATENT DOCUMENTS

| | | | |
|---|---|---|---|
| 9,518,496 | B2 | 12/2016 | Hill et al. |
| 10,273,853 | B2 | 4/2019 | Golin |
| 10,711,677 | B2 | 7/2020 | Noren, IV et al. |
| 2011/0308234 | A1* | 12/2011 | De Rudder ............. F01N 13/08 60/301 |
| 2015/0040537 | A1* | 2/2015 | Hicks ................. B01F 25/3131 60/273 |
| 2016/0305296 | A1* | 10/2016 | Tobe ....................... B01F 25/10 |
| 2017/0114693 | A1* | 4/2017 | Stelzer ............... B01D 53/9418 |
| 2019/0101037 | A1* | 4/2019 | Golin ...................... F01N 3/021 |
| 2019/0383194 | A1* | 12/2019 | Tummala ............... F01N 3/2066 |
| 2020/0362739 | A1* | 11/2020 | Srinivasan ............ F01N 3/0205 |

* cited by examiner

INTERNAL SWIRLER TUBE FOR EXHAUST CATALYST

FIELD

The present disclosure relates to exhaust system assemblies for internal combustion engines and more particularly to exhaust aftertreatment systems that include a swirler tube inside an exhaust catalyst.

BACKGROUND

This section provides background information related to the present disclosure and is not necessarily prior art.

In an attempt to reduce the quantity of NOx and particulate matter emitted to the atmosphere during internal combustion engine operation, a number of exhaust aftertreatment devices have been developed. A need for exhaust aftertreatment systems includes, but is not limited to, applications where diesel combustion engines are implemented. Typical aftertreatment systems for diesel engine exhaust may include one or more of the following: a hydrocarbon (HC) injector, a diesel oxidation catalyst (DOC), a diesel particulate filter (DPF), a urea injector, a selective catalytic reduction (SCR) system, and an ammonia slip catalyst (ASC).

SCR technology has been used to reduce nitrogen oxides (NOx) emissions in the exhaust of combustion engines. Some of these systems are constructed using urea-based technology and include a container for storing a reductant (e.g., urea) and a delivery system, including an injector, for example, for transmitting the reductant from the container to the exhaust stream. A mixer is often provided for mixing the injected reductant with the exhaust gas before the reductant reaches a catalyst with which the reductant reacts, such as in the SCR system.

Such aftertreatment systems typically include sensors, such as NOx sensors to measure operating conditions and the effectiveness of the system and to control the operation of the system and/or the engine. The ability of such sensors to accurately measure nitrogen oxides (NOx) and other emissions in the exhaust is therefore important to the operation of the aftertreatment system and the overall operation of the engine.

SUMMARY

The invention provides for an exhaust system assembly that enhances the mixing of exhaust gases passing through a catalyst housing to improve the accuracy of NOx sensor measurements at an exhaust outlet of the catalyst housing. The exhaust system assembly includes at least one catalyst core and a swirler tube that are positioned inside the catalyst housing. The exhaust outlet has an exhaust outlet axis. The swirler tube extends about a swirler tube axis and includes a first swirler tube end, a second swirler tube end, and a tube wall that extends axially between the first and second swirler tube ends. The tube wall defines an inner volume of the swirler tube. The swirler tube has a plurality of openings in the tube wall that permit radial exhaust flow into the inner volume of the swirler tube from the catalyst housing.

The exhaust system assembly may optionally include a reductant injector and the swirler tube may be placed at a variety of different locations inside the catalyst housing. For example, the swirler tube may be positioned inside the catalyst housing at a location where the swirler tube axis is co-axially aligned with the exhaust outlet axis. In other words, the swirler tube may be positioned such that the swirler tube axis is not co-axially aligned with the reductant injector axis.

The first swirler tube end includes an inner circumference and a plurality of blades. Each blade extends inward relative to the inner circumference of the first swirler tube end and includes an oblique surface that is arranged at an oblique angle relative to the swirler tube axis. In operation, these blades induce a vortex (i.e., create a swirling effect) in the exhaust gases exiting the first swirler tube end. The first swirler tube end is configured as an open tube end, the second swirler tube end is configured as a closed tube end, and the swirler tube is arranged inside the catalyst housing such that a sequential flow path is created where all of the exhaust gases flowing through the catalyst housing must pass through the openings in the swirler tube and then through the inner volume of the swirler tube where it exits at the first swirler tube end. As a result, the exhaust gases flowing through the catalyst housing ultimately pass by (i.e., through or over) the plurality of blades at the first swirler tube end, creating a swirling effect in the exhaust gases. This swirling effect, or vortex, promotes mixing and a more even distribution of nitrogen oxide (NOx) species in the exhaust flow exiting the catalyst housing through the exhaust outlet, where an emissions sensors (NOx sensor) is placed. In addition to this swirling effect, the construction and arrangement of the swirler tube increases the travel distance and thus the dwell time of the exhaust gases for a given packaging length of the catalyst housing. Together, these aspects of the swirler tube's design increases the accuracy and effectiveness of the emissions sensors (NOx sensor), which can improve operation of the aftertreatment system and/or engine.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
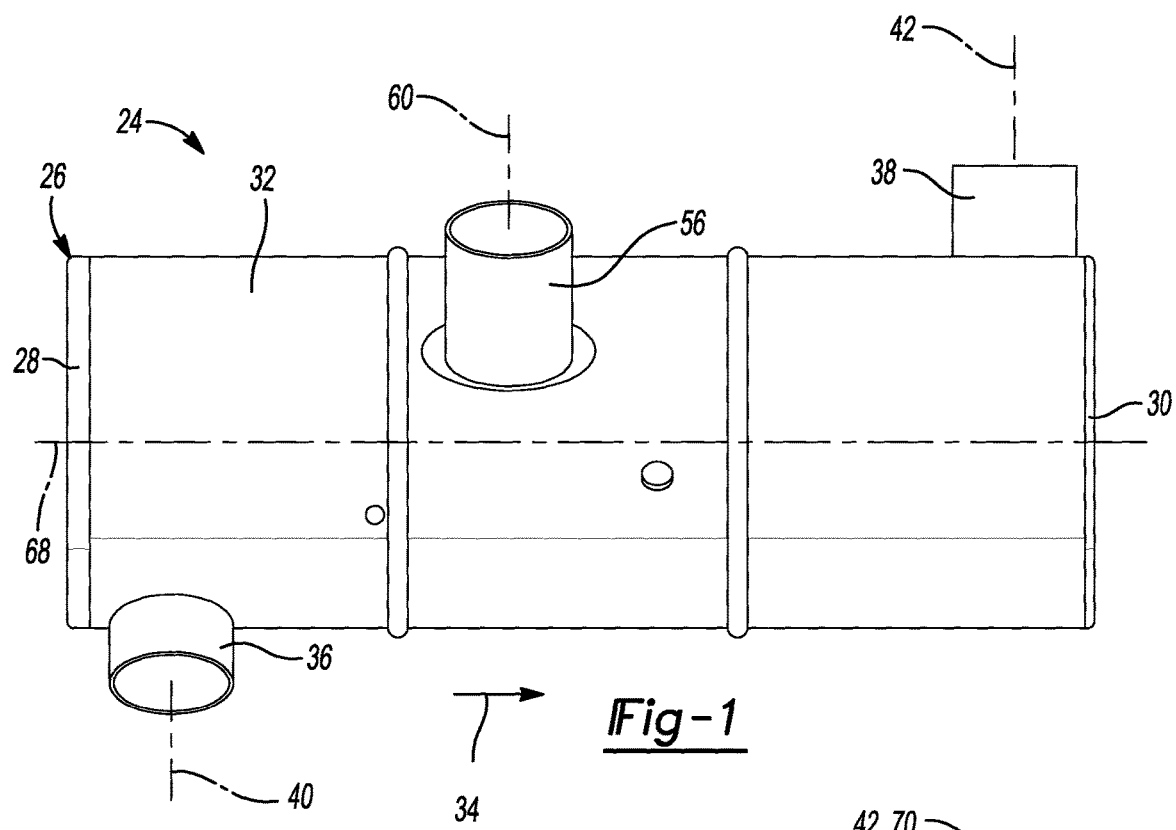
FIG. 1 is a top perspective view of an exemplary exhaust catalyst housing that is constructed in accordance with the present disclosure.

Referring to the Figures, wherein like numerals indicate corresponding parts throughout the several views, an exhaust system assembly 20 is illustrated along with several different designs for a swirler tube 22, 122, 222.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2A:
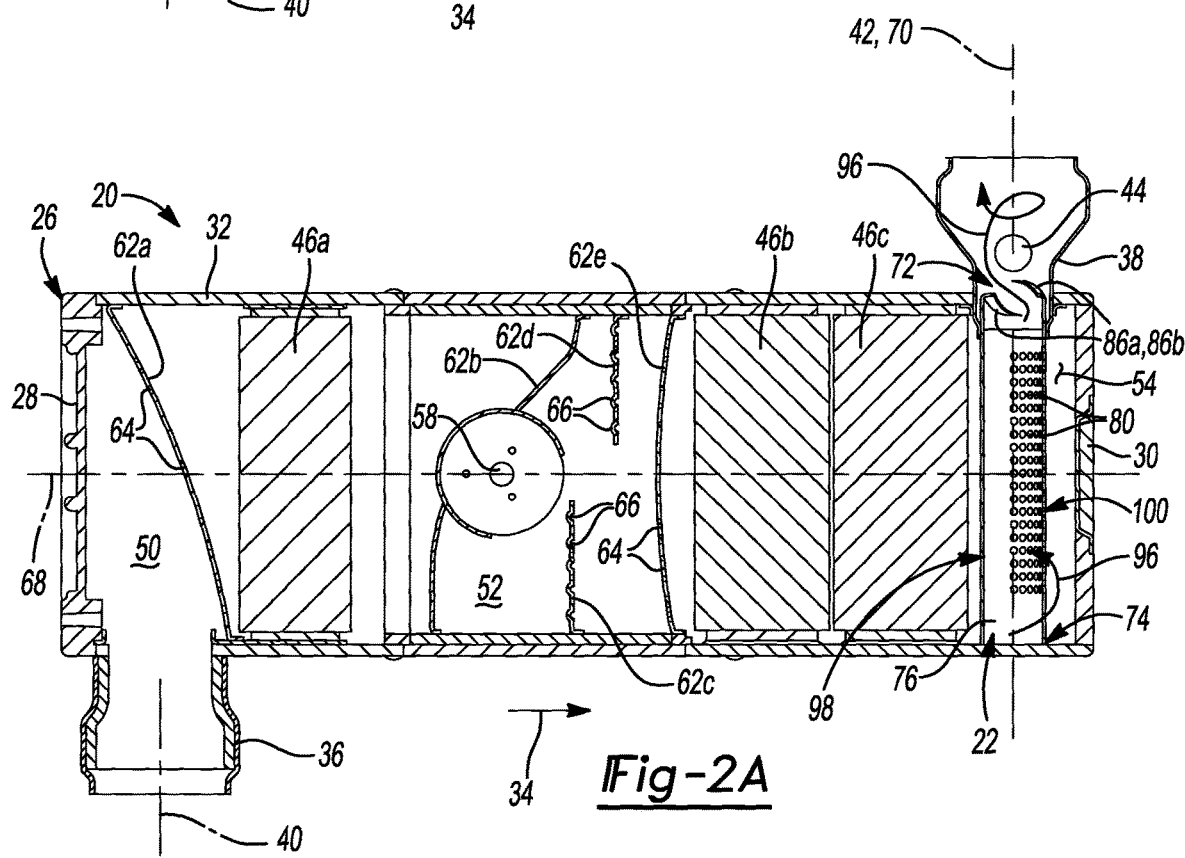
FIG. 2A is a bottom section view of an exemplary exhaust system assembly, which is constructed in accordance with the present disclosure and includes the exhaust catalyst housing shown in FIG. 1, exemplary catalyst cores, an exemplary reductant injector, and an exemplary swirler tube.
Figure 2B:
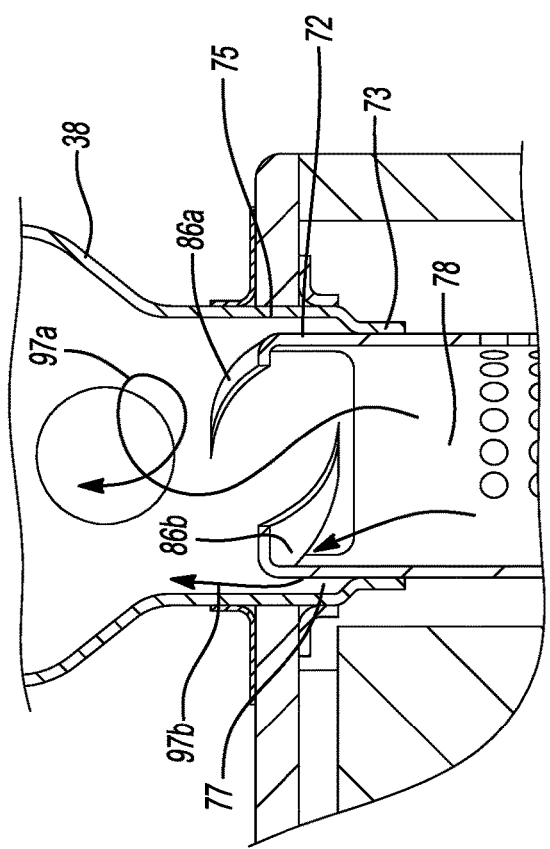
FIG. 2B is an enlarged partial section view of the exemplary exhaust system assembly shown in FIG. 2A.
Figure 3:
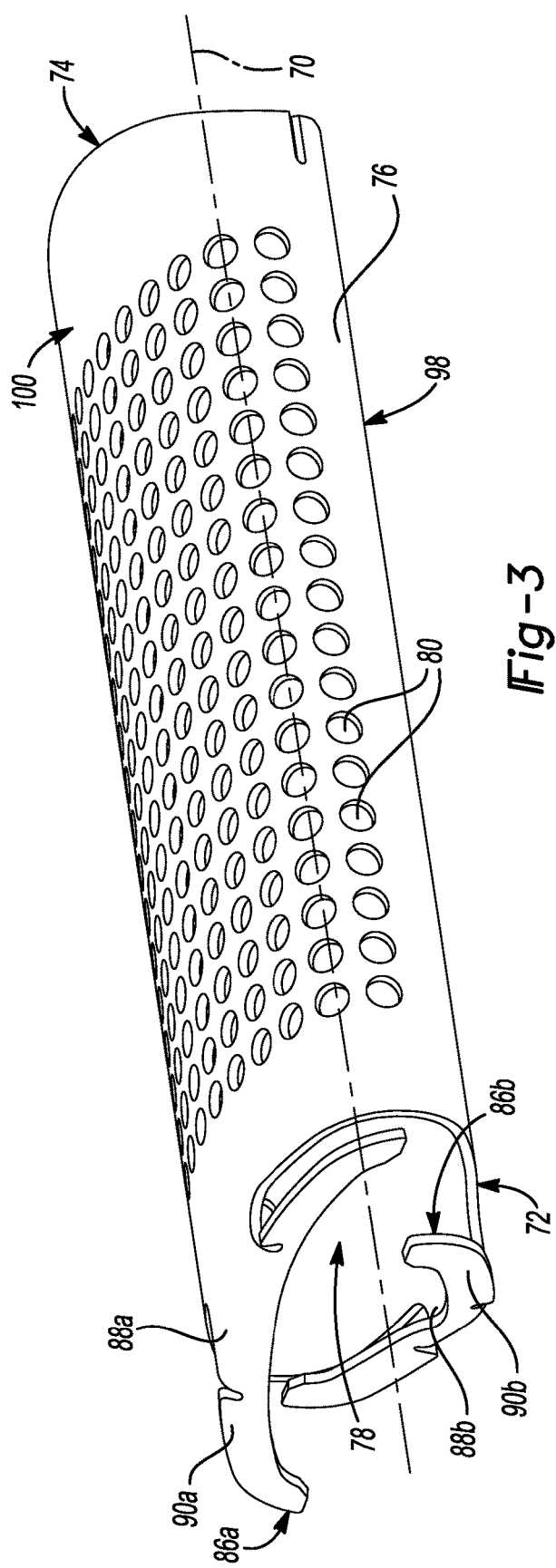
FIG. 3 is a side perspective view of the exemplary swirler tube illustrated in FIG. 2.
Figure 5:
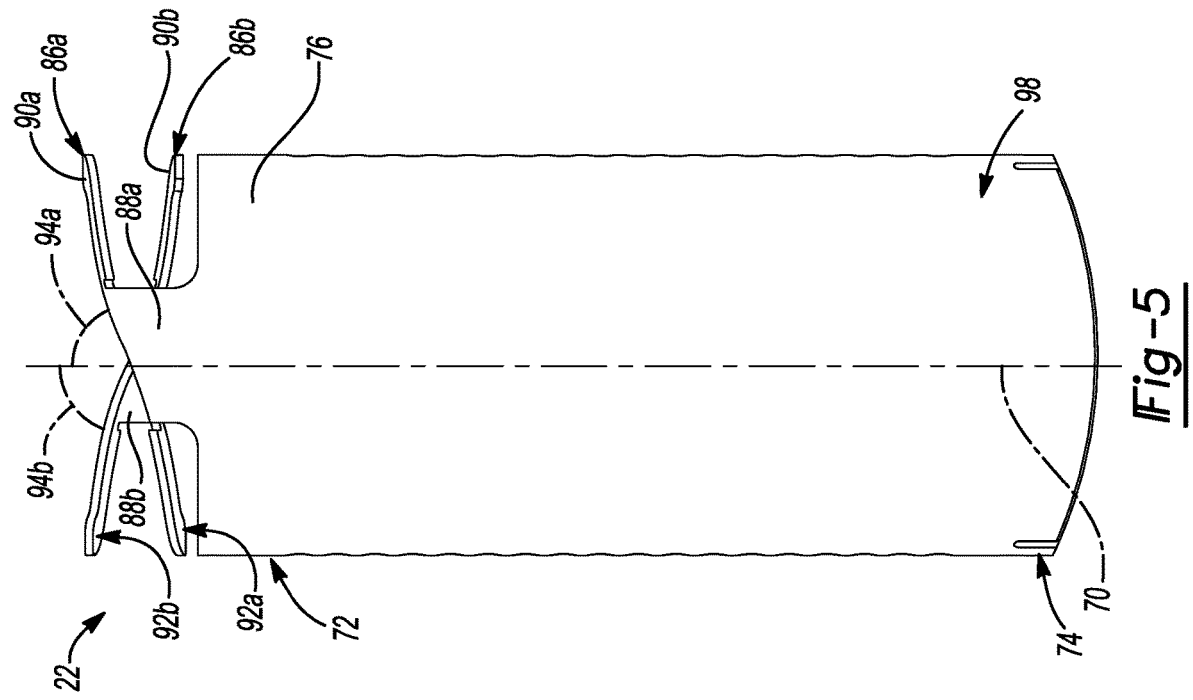
FIG. 5 is a back plan view of the exemplary swirler tube illustrated in FIG. 2.
Figure 4:
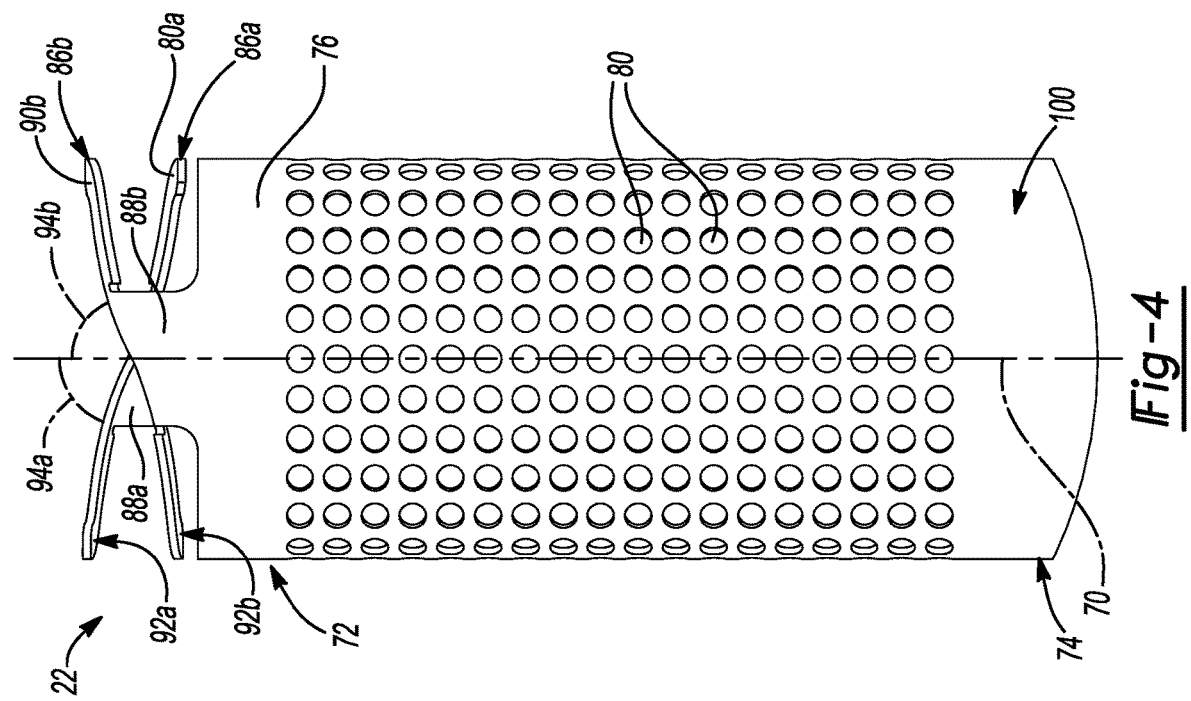
FIG. 4 is a front plan view of the exemplary swirler tube illustrated in FIG. 2.
Figure 6:
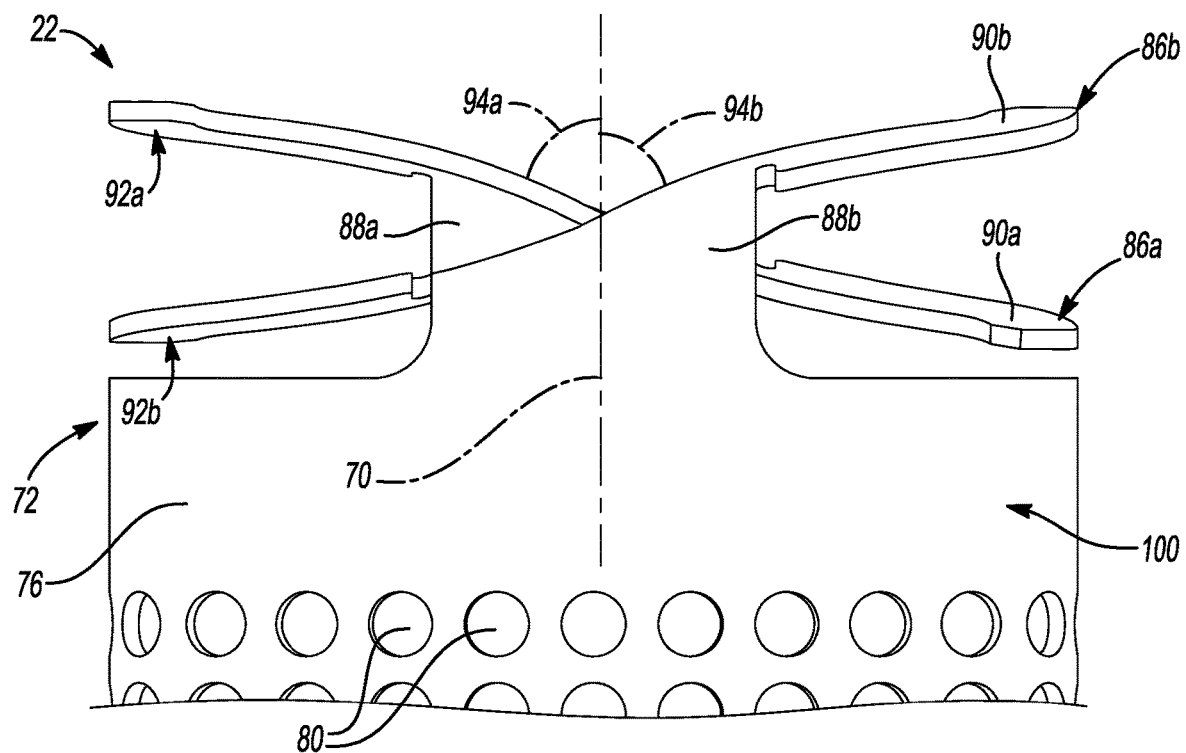
FIG. 6 is an enlarged back plan view of one end of the exemplary swirler tube illustrated in FIG. 2.
Figure 7:
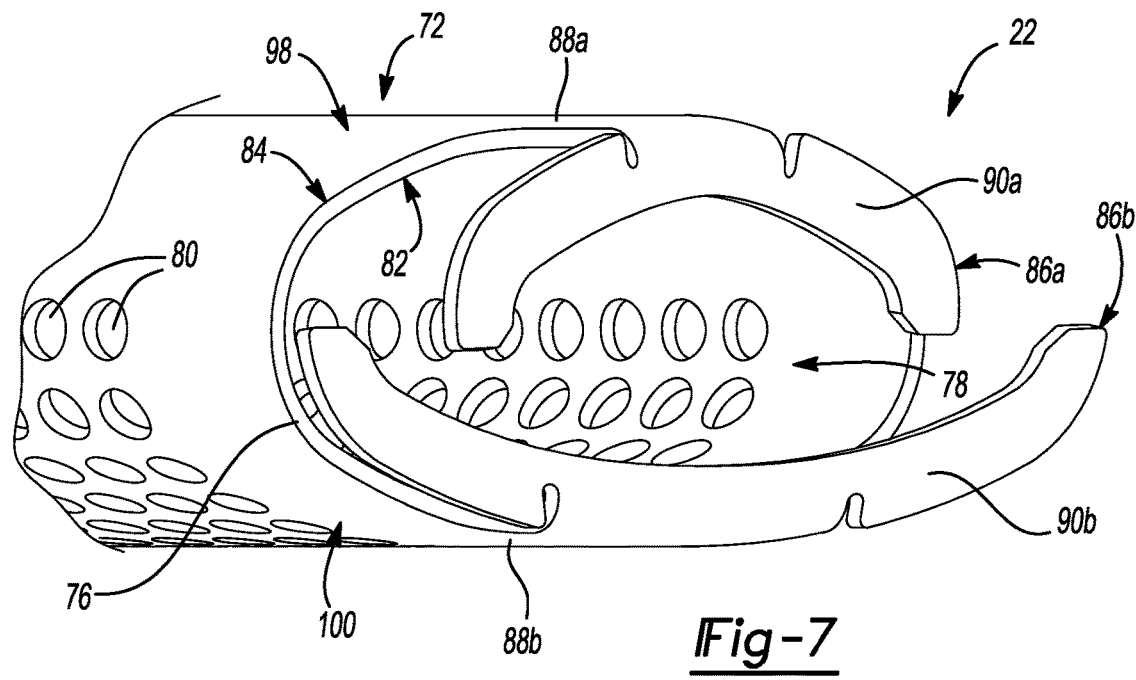
FIG. 7 is an enlarged perspective view of the end of the exemplary swirler tube shown in FIG. 6.
Figure 8:
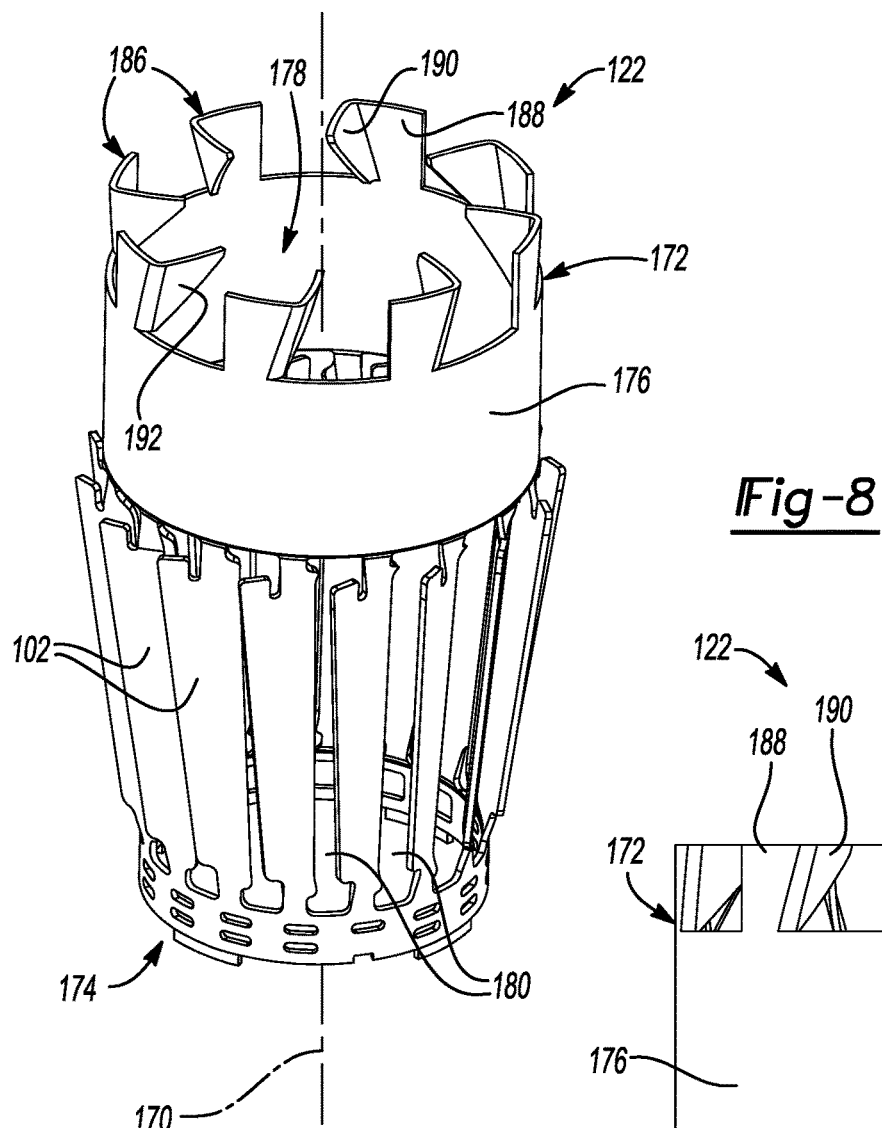
FIG. 8 is a side perspective view of another exemplary swirler tube that is constructed in accordance with the present disclosure.
Figure 9:
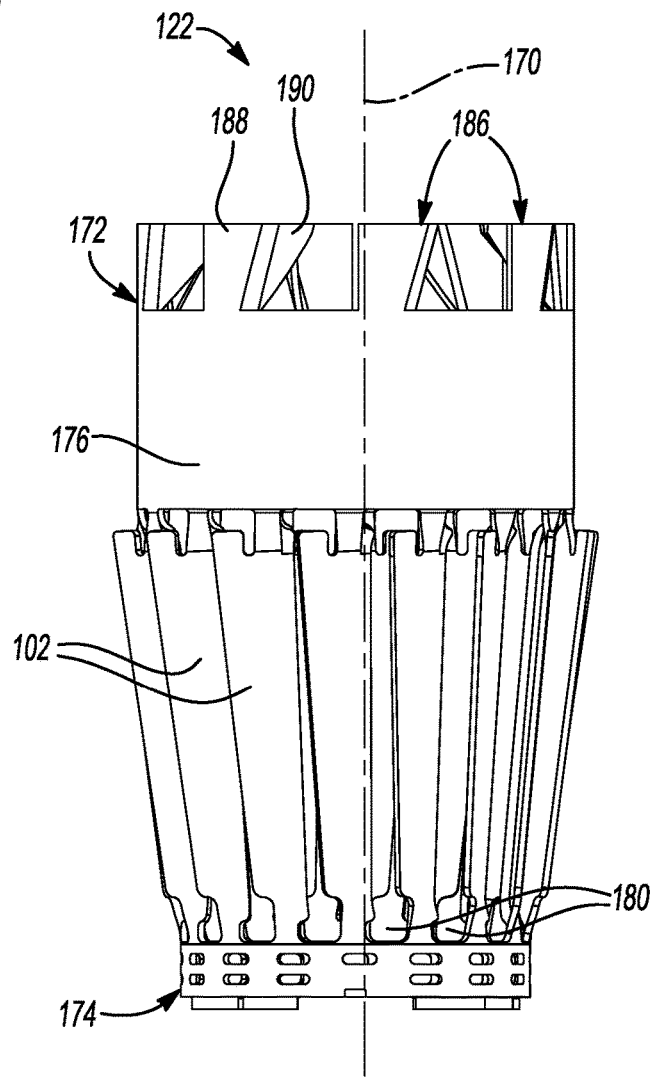
FIG. 9 is a top plan view of the exemplary swirler tube illustrated in FIG. 8.
Figure 10:
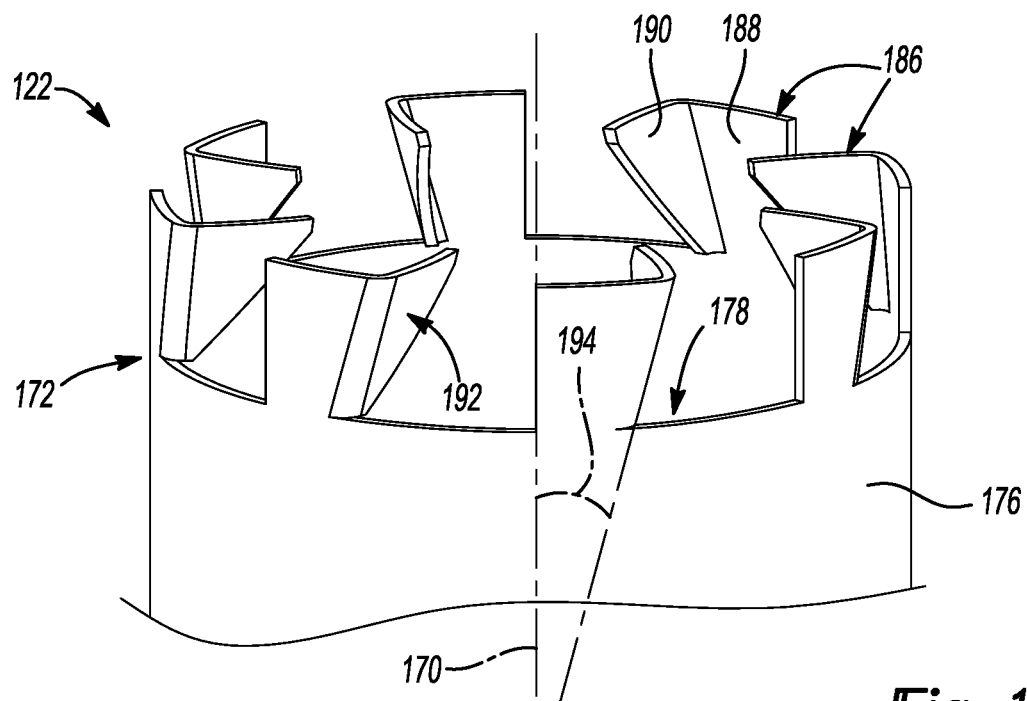
FIG. 10 is an enlarged perspective view of one end of the exemplary swirler tube illustrated in FIG. 8.
Figure 11:
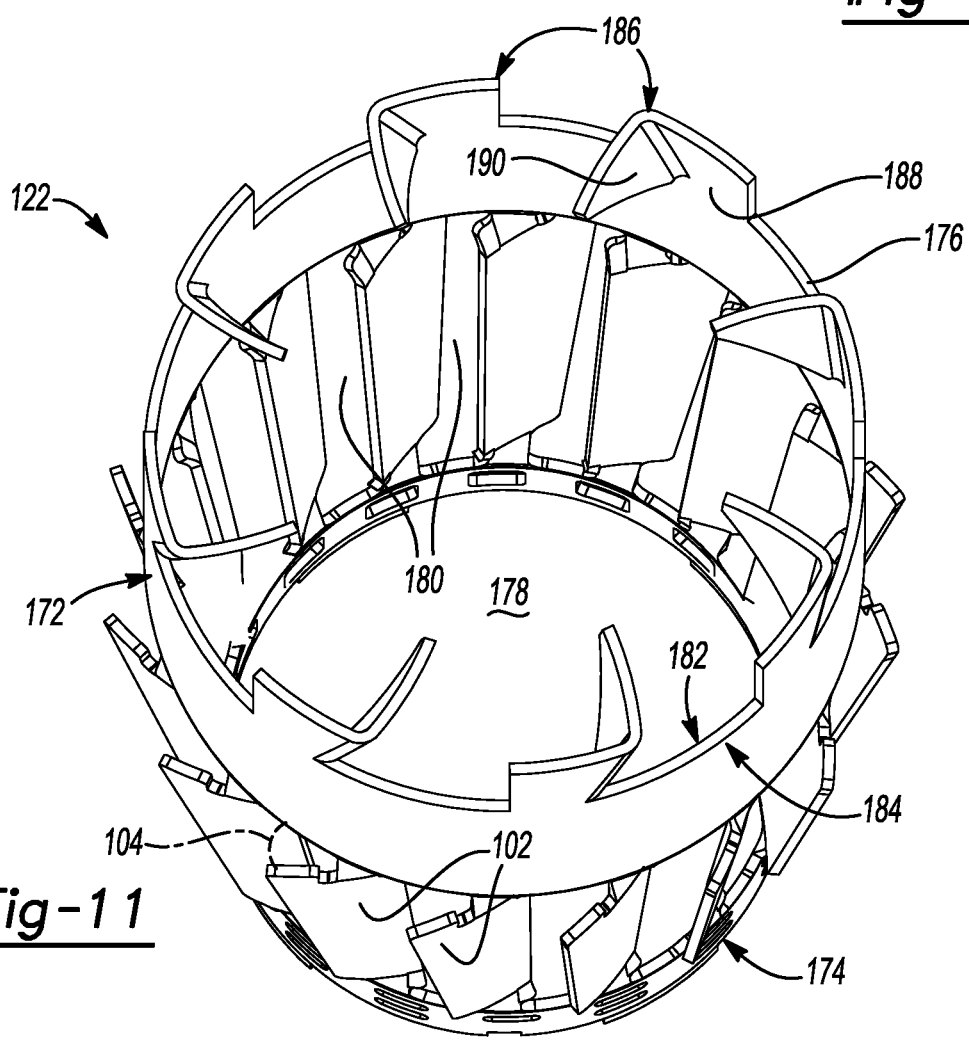
FIG. 11 is a perspective end view of the exemplary swirler tube illustrated in FIG. 8.

With reference to FIGS. 1-3, an exhaust system assembly 20 is provided that forms part of an exhaust aftertreatment system 24. The exhaust aftertreatment system 24 is designed to treat exhaust gases generated by an internal combustion engine and reduce certain types of emissions in the exhaust, such as unburned hydrocarbons (e.g., soot) and nitrogen oxides (NOx). The exhaust system assembly 20 illustrated in FIGS. 1 and 2 is designed to treat the exhaust gases produced by a compression ignition engine (i.e., diesel engine); however, it should be appreciated that the present disclosure equally applies to other types of internal combustion engines, such as spark ignition engines (i.e., gasoline engines).

The exhaust system assembly 20 includes a catalyst housing 26. The catalyst housing 26 is formed by a first end wall 28, a second end wall 30, and a side wall 32. The side wall 32 has a tubular shape and extends in a longitudinal direction 34 between the first and second end walls 28, 30. It should thus be appreciated that the terms "longitudinal" and "longitudinally," as used herein, means the component or axis extends in the longitudinal direction 34 or is parallel to the longitudinal direction 34. While the catalyst housing 26 shown in FIGS. 1 and 2 is oriented horizontally, it should be appreciated that the catalyst housing 26 could be mounted to a vehicle in a different orientation, such as in vertical or slanted orientations. Although other materials may be used, in the illustrated example, the catalyst housing 26 is made of a metal, such as steel. As such, the first and second end walls 28, 30 can be welded, fastened, or pressed/crimped into engagement with the side wall 32 of the catalyst housing 26, for example. It should also be appreciated that the catalyst housing 26 may include multiple side wall segments that are welded, fastened, or otherwise connected to form the catalyst housing 26.

An exhaust inlet 36 is positioned in the side wall 32 of the catalyst housing 26 at a location that is adjacent to the first end wall 28. An exhaust outlet 38 is also positioned in the side wall 32 of the catalyst housing 26, but at a location that is adjacent to the second end wall 30. The exhaust inlet 36 has an exhaust inlet axis 40 and the exhaust outlet 38 has an exhaust outlet axis 42. Both the exhaust inlet axis 40 and the exhaust outlet axis 42 are perpendicular to the longitudinal direction 34 of the side wall 32, but in the illustrated embodiment, are arranged out-of-plane relative to one another and generally extend outwardly from the side wall 32 in opposing directions. The exhaust inlet 36 may be coupled to and arranged in fluid communication with an exhaust pipe or another component of the exhaust aftertreatment system 24, such as a diesel particulate filter (DPF), for example. The exhaust outlet 38 may be coupled to and arranged in fluid communication with a tail pipe, a muffler, or another component of the exhaust aftertreatment system 24. One or more emissions sensors 44 are positioned in the exhaust outlet 38 and are configured to detect certain emissions, such as nitrogen oxide (NOx) emissions, for example.

At least one catalyst core 46a-c is positioned inside the catalyst housing 26. The particular exhaust aftertreatment system 24 illustrated in FIG. 2 includes a diesel oxidation catalyst (DOC) 46a, a selective catalytic reduction (SCR) element 46b, and an ammonia slip catalyst (ASC) 46c, all of which are housed within the catalyst housing 26. More specifically, in the illustrated example, the diesel oxidation catalyst 46a is positioned longitudinally between the first end wall 28 and the selective catalytic reduction element 46b and the ammonia slip catalyst 46c is positioned longitudinally between the selective catalytic reduction element 46b and the second end wall 30. In other words, the diesel oxidation catalyst 46a is positioned longitudinally between the exhaust inlet 36 and the selective catalytic reduction element 46b and the ammonia slip catalyst 46c is positioned longitudinally between the selective catalytic reduction element 46b and the exhaust outlet 38 such that the diesel oxidation catalyst 46a is positioned upstream of the selective catalytic reduction element 46b and such that the ammonia slip catalyst 46c is positioned downstream of the selective catalytic reduction element 46b. Thus, an inlet chamber 50 is defined within the catalyst housing 26 between the first end wall 28 and the diesel oxidation catalyst 46a. A mixing chamber 52 is defined within the catalyst housing 26 between the diesel oxidation catalyst 46a and the selective catalytic reduction element 46b. Finally, an outlet chamber 54 is defined within the catalyst housing 26 between the ammonia slip catalyst 46c and the second end wall 30. It should be appreciated that exhaust gases generally flow through the catalyst housing 26 in the longitudinal direction 34 from the inlet chamber 50 to the outlet chamber 54.

The exhaust aftertreatment system 24 illustrated also includes a reductant injector 56 that is positioned in the side wall 32 of the catalyst housing 26 at a location that is positioned longitudinally between the diesel oxidation catalyst 46 and the selective catalytic reduction element 46b. In other words, the reductant injector 56 is positioned downstream of the diesel oxidation catalyst 46a, but upstream of both the selective catalytic reduction element 46b and the ammonia slip catalyst 46c. More specifically, the side wall 32 of the catalyst housing 26 may include an injector opening 58 through which the reductant injector 56 extends. The reductant injector 56 has an injector axis 60 where the reductant injector 56 is configured to spray a reductant, such as urea, into the mixing chamber 52 of the catalyst housing 26 along the injector axis 60. The reductant injector 56 axis is also arranged at a different orientation than the exhaust inlet axis 40 and the exhaust outlet axis 42. The reductant injector 56 may receive the reductant (e.g., urea) from a reductant tank (not shown). The reductant mixes with the exhaust gas in the mixing chamber 52 prior to flowing through the selective catalytic reduction element 46b. In the illustrated example, the injector axis 60 is transverse to the longitudinal direction 34 of the catalyst housing 26; however, it should be appreciated that in other embodiments the injector axis 60 may be arranged at different angles relative to the longitudinal direction 34 of the catalyst housing 26 than that shown in the drawings.

One or more baffles or mixing plates 62a-e may be positioned inside the catalyst housing 26. For example, the catalyst housing 26 illustrated in FIG. 2 includes a first mixing plate 62a in the inlet chamber 50 and second, third, fourth, and fifth mixing plates 62b-e are positioned in the mixing chamber 52. Each of the mixing plates 62a-e may include a plurality of apertures 64 and/or a plurality of louvers 66, through which exhaust may flow, to provide additional flow turbulence and mixing of the exhaust gases and reductant prior to entering the selective catalytic reduction element 46b. The mixing plates 62a-e may also spread the mixture of reductant and exhaust gas over a larger cross-sectional area so that the mixture will flow into the selective catalytic reduction element 46b over a larger cross-sectional area. In some embodiments, the contours, the shape, and/or position of the mixing plates 62a-e may direct the mixture of exhaust gas and reductant away from peripheral portions of the selective catalytic reduction element 46b and toward a center portion of the selective catalytic reduction element 46b.

The apertures 64 and/or louvers 66 in the mixing plate(s) 62a-e may be provided in a crescent shape and/or arranged in an arc shaped pattern to create a swirling exhaust gas motion inside the catalyst housing 26. As droplets of reductant enter the mixing chamber 52 from the reductant injector 56, the swirling exhaust gases urge the droplets towards a centerline axis 68 of the catalyst housing 26. Thus, the shape, size, and position of the various apertures 64 and/or louvers 66 may be defined to further mix the exhaust gas and reductant prior to entering the downstream catalyst(s) 46a-c. The mixing plate(s) 62a-e therefore distribute the mixture of reductant and exhaust gas over a desired inlet area of the downstream catalyst(s) 46a-c to optimize efficiency of catalyst operation.

Still referring to FIGS. 1-3, the exhaust system assembly 20 includes a swirler tube 22 that is positioned inside the catalyst housing 26 and extends about a swirler tube axis 70. The swirler tube 22 may be positioned inside the inlet chamber 50, the outlet chamber 54, or even the mixing chamber 52 of the catalyst housing 26; however, in all cases the swirler tube 22 is positioned such that the swirler tube axis 70 is not co-axially aligned with the injector axis 60. The swirler tube 22 may therefore be positioned upstream or downstream of the reductant injector 56. It should be appreciated that the reductant injector 56 does not inject or spray reductant directly into the swirler tube 22 described herein. However, the reductant injector 56 may be configured to spray the reductant into a different baffle or tube other than the swirler tube 22 described herein. The swirler tube 22 includes a first swirler tube end 72, a second swirler tube end 74, and a tube wall 76 that extends axially between the first and second swirler tube ends 72, 74. The tube wall 76 defines an inner volume 78 of the swirler tube 22. The swirler tube 22 has a plurality of openings 80 in the tube wall 76 that permit radial exhaust flow into the inner volume 78 of the swirler tube 22 from the catalyst housing 26.

In the illustrated example, the swirler tube 22 is positioned inside the catalyst housing 26 between the ammonia slip catalyst 46 and the second end wall 30 and the swirler tube axis 70 is co-axially aligned with the exhaust outlet axis 42. As a result, the swirler tube axis 70 is longitudinally spaced from and arranged at a different orientation relative to the injector axis 60. In other words, the swirler tube 22 is positioned inside the outlet chamber 54 of the catalyst housing 26. The inner volume 78 and the first swirler tube end 72 are positioned in fluid communication with the exhaust outlet 38 of the catalyst housing 26.

As best seen in FIGS. 3-7, the first swirler tube end 72 includes an inner circumference 82, an outer circumference 84, and a plurality of blades 86a, 86b. Each blade 86a, 86b extends inwardly towards the swirler tube axis 70 relative to the inner circumference 82 of the first swirler tube end 72. Each blade 86a, 86b includes an axial portion 88a, 88b that extends parallel to the swirler tube axis 70 and a distal portion 90a, 90b that includes an oblique surface 92a, 92b. The oblique surface 92a, 92b of each blade 86a, 86b is arranged at an oblique angle 94a, 94b relative to the swirler tube axis 70. Because the oblique surface 92a, 92b of each blade 86a, 86b is inward of the inner circumference 82 of the first swirler tube end 72, the blades 86a, 86b induce a vortex in the exhaust gases exiting the first swirler tube end 72. The plurality of blades 86a, 86b are arranged entirely within the outer circumference 84 of the first swirler tube end 72 such that no part of any blade 86a, 86b extends beyond the outer circumference 84 of the first swirler tube end 72.

As shown in FIGS. 2A and 2B, the first swirler tube end 72 is arranged in abutting fluid-tight engagement with a first outlet portion 73 of the exhaust outlet 38 and the first swirler tube end 72 is configured as an open tube end through which exhaust may pass from the inner volume 78 to the exhaust outlet 38. The second swirler tube end 74 is arranged in abutting fluid-tight engagement with the side wall 32 of the catalyst housing 26 such that the second swirler tube end 74 is configured as a closed tube end through which exhaust does not pass. This arrangement creates a sequential flow path 96 where all exhaust flowing through the catalyst housing 26 must pass through the inner volume 78 of the swirler tube 22 before exiting through the exhaust outlet 38. In other words, no exhaust gases flow directly from the outlet chamber 54 to the exhaust outlet 38 without first passing through the inner volume 78 of the swirler tube 22. This means that all of the exhaust gases that enter the catalyst housing 26 through the exhaust inlet 36 and that exit the catalyst housing 26 through the exhaust outlet 38 must pass through the openings 80 in the swirler tube 22 and pass through the inner volume 78 of the swirler tube 22. The exhaust outlet 38 includes a second outlet portion 75 downstream of the first outlet portion 73 that may have the same or a different inner diameter. In the illustrated example, the second outlet portion 75 has a larger inner diameter than the inner diameter of the first outlet portion 73 and that is larger than the outer circumference 84 of the first swirler tube end 72 such that a circumferential gap 77 is created between the second outlet portion 75 of the exhaust outlet 38 and the first swirler tube end 72. Thus, a first portion 97a of exhaust gases exiting the first swirler tube end 72 flows by the blades 86a, 86b at the first swirler tube end 72 such that a vortex or swirling effect is created in the exhaust gases that promotes mixing and a more even distribution of nitrogen oxide (NOx) species in the exhaust flow exiting the catalyst housing 26 through the exhaust outlet 38, where the emissions sensors 44 (e.g., NOx sensor) is placed. A second portion 97b of exhaust gases exiting the first swirler tube end 72 flows radially outwards between the blades 86a, 86b and into the circumferential gap 77 that is created between the second outlet portion 75 and the first swirler tube end 72. The geometry (i.e., size and shape) of the second portion 97b of the exhaust outlet 38 and the first swirler tube end 72 can be selected or tuned to adjust the percentage of exhaust gases that are split between the first and second portions 97a, 97b of the sequential flow path 96 of exhaust entering the exhaust outlet 38. The geometry (i.e., size, shape, spacing) and number of the blades 86a, 86b can also be selected or tuned to adjust the percentage of exhaust gases that are split between the first and second portions 97a, 97b of the sequential flow path 96 of exhaust entering the exhaust outlet 38. Finally, it should be appreciated that in configurations where the first and second outlet portions 73, 75 have the same inner diameters, all (i.e., 100 percent) of the exhaust gases exiting the first swirler tube end 72 flow by the 86a, 86b.

Although other configurations are possible, in the example illustrated in FIGS. 3-7, the plurality of blades 86a, 86b includes a first blade 86a and a second blade 86b that are arranged in a diametrically opposed relationship. The swirler tube 22 includes an upstream side 98 facing the ammonia slip catalyst 46 and a downstream side 100 facing the second end wall 30 of the catalyst housing 26. The plurality of openings 80 in the swirler tube 22 are arranged only in the downstream side 100 of the swirler tube 22 as an array or grid of perforations. By contrast, the upstream side 98 of the swirler tube 22 has no openings 80. This arrangement increases the travel distance and thus the dwell time of the exhaust gases for a given packaging length of the catalyst housing 26 because the exhaust gases have to flow around the upstream side 98 of the swirler tube 22 before entering the inner volume 78 of the swirler tube 22 through the openings 80 in the downstream side 100. The axial portion 88a of the first blade 86a extends axially from the upstream side 98 at the first swirler tube end 72 and the axial portion 88b of the second blade 86b extends axially from the downstream side 100 at the first swirler tube end 72. The distal portion 90a, 90b of each of the blades 86a, 86b has an angled, boomerang-like shape. As a result, the oblique angle 94a between the oblique surface 92a of the first blade 86a and the swirler tube axis 70 is equal and opposite to the oblique angle 94b between the oblique surface 92b of the second blade 86b and the swirler tube axis 70. Although other materials may be used, in the illustrated example, the swirler tube 22 is made of a metal, such as steel. As such, the first and second swirler tube ends 72, 74 can be welded, fastened, or pressed/crimped into engagement with the side wall 32 of the catalyst housing 26 and the exhaust outlet 38, for example.

With reference to FIGS. 8-11, another swirler tube 122 is illustrated Like in the previous design, the swirler tube 122 illustrated in FIGS. 8-11 includes a first swirler tube end 172, a second swirler tube end 174, and a tube wall 176 that extends axially between the first and second swirler tube ends 172, 174. The tube wall 176 defines an inner volume 178 of the swirler tube 122. However, unlike in the previous design, the swirler tube 122 illustrated in FIGS. 8-11 includes a series of axially extending fins 102 that are circumferentially spaced about the swirler tube 122. A plurality of openings 180 in the tube wall 176 are arranged between adjacent fins 102 and permit radial exhaust flow into the inner volume 178 of the swirler tube 122 from the catalyst housing 26. The first swirler tube end 172 includes an inner circumference 182, an outer circumference 184, and a plurality of blades 186. Each of the axially extending fins 102 runs parallel to a swirler tube axis 170 and is arranged at a pitch angle 104 relative to the inner and outer circumference 182, 184 of the first swirler tube end 172 to induce a vortex inside the swirler tube 122. Each blade 186 extends inwardly towards the swirler tube axis 170 relative to the inner circumference 182 of the first swirler tube end 172. Each blade 186 includes an axial portion 188 that extends parallel to the swirler tube axis 170 and a distal portion 190 that includes an oblique surface 192. The distal portion 190 of each of the blades 186 in this example has an angled, fin-like shape. The oblique surface 192 of each blade 186 is arranged at an oblique angle 194 relative to the swirler tube axis 170. Because the oblique surface 192 of each blade 186 is inward of the inner circumference 182 of the first swirler tube end 172, the blades 186 induce a vortex in the exhaust gases exiting the first swirler tube end 172. The plurality of blades 186 are arranged entirely within the outer circumference 184 of the first swirler tube end 172 such that no part of any blade 186 extends beyond the outer circumference 184 of the first swirler tube end 172.

Figure 12:
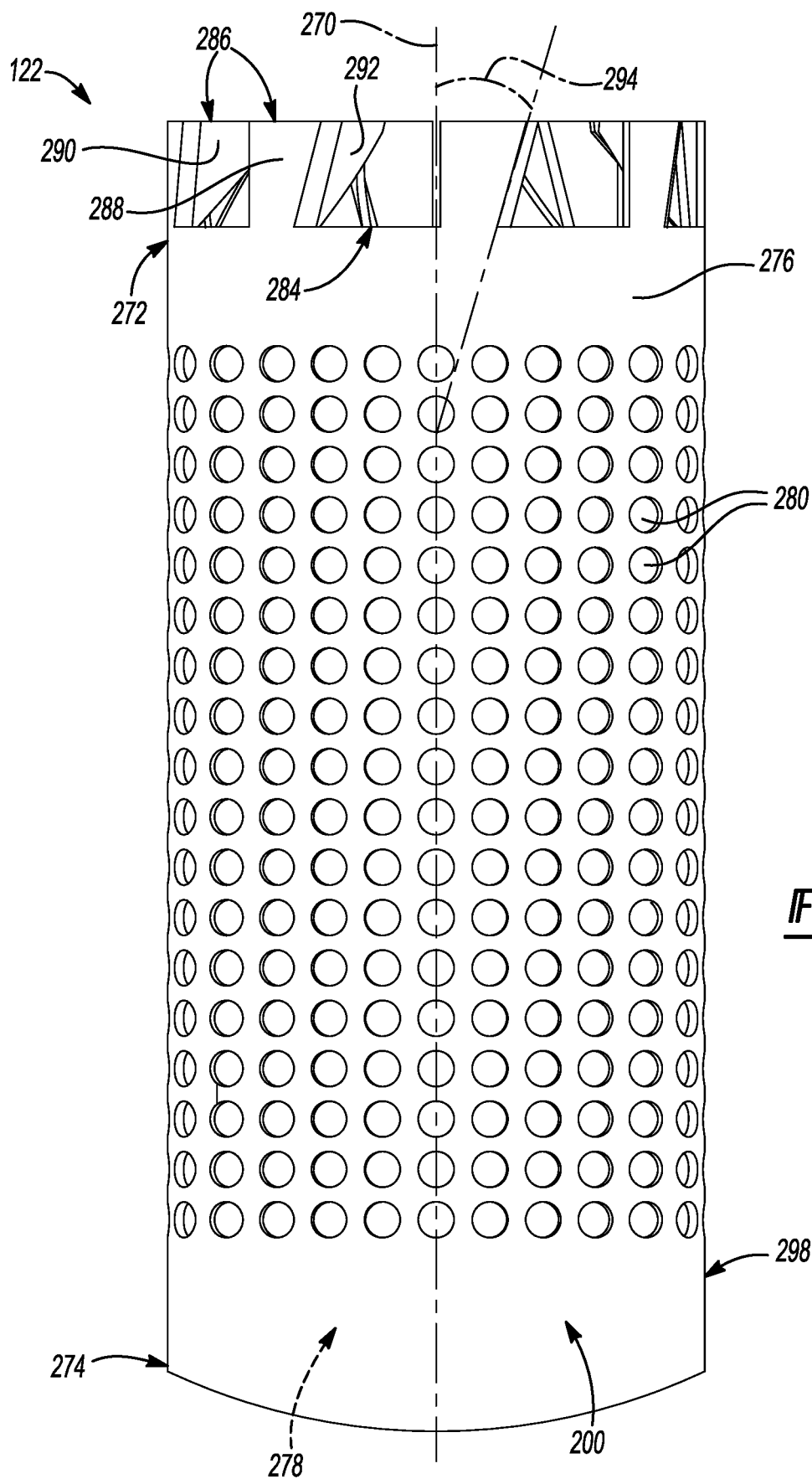
FIG. 12 is a back plan view of another exemplary swirler tube that is constructed in accordance with the present disclosure.

With reference to FIG. 12, another swirler tube 222 is illustrated. The swirler tube 222 illustrated in FIG. 12 is the same as the swirler tube 22 illustrated in FIGS. 3-7, except with the blades 186 illustrated in FIGS. 8-11. Thus, the swirler tube 222 illustrated in FIG. 12 includes a first swirler tube end 272, a second swirler tube end 274, and a tube wall 276 that extends axially between the first and second swirler tube ends 272, 274. The tube wall 276 defines an inner volume 278 of the swirler tube 222. The swirler tube 222 illustrated in FIG. 12 includes an upstream side 298 and a downstream side 200. A plurality of openings 280 are arranged only in the downstream side 200 of the swirler tube 222 as an array or grid of perforations. A plurality of blades 286 at the first swirler tube end 272 extend inwardly towards a swirler tube axis 270. Like in FIGS. 8-11, each of the blades 286 illustrated in FIG. 12 includes an axial portion 288 that extends parallel to the swirler tube axis 270 and a distal portion 290 that includes an oblique surface 292. The distal portion 290 of each of the blades 286 in this example has an angled, fin-like shape. The oblique surface 292 of each blade 286 is arranged at an oblique angle 294 relative to the swirler tube axis 270. Because the oblique surface 292 of each blade 286 is inward of the inner circumference 282 of the first swirler tube end 272, the blades 286 induce a vortex in the exhaust gases exiting the first swirler tube end 272. The plurality of blades 286 are arranged entirely within the outer circumference 284 of the first swirler tube end 272 such that no part of any blade 286 extends beyond the outer circumference 284 of the first swirler tube end 272.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust system assembly comprising:
   a catalyst housing including an exhaust inlet and an exhaust outlet;
   at least one catalyst core positioned inside said catalyst housing;
   a swirler tube positioned inside said catalyst housing, said swirler tube extending about a swirler tube axis and including a first swirler tube end, a second swirler tube end opposite said first swirler tube end, and a tube wall that extends axially between said first and second swirler tube ends and defines an inner volume of said swirler tube; and
   a reductant injector positioned on said catalyst housing, said reductant injector having an injector axis that is longitudinally spaced from said swirler tube axis;
   said swirler tube including a plurality of openings in said tube wall that permit radial exhaust flow into said inner volume of said swirler tube from said catalyst housing; said first swirler tube end including an inner circumference and a plurality of blades that extend inward relative to said inner circumference of said first swirler tube end; and
   each of said plurality of blades including an oblique surface that is arranged at an oblique angle relative to said swirler tube axis to induce a vortex in exhaust exiting said first swirler tube end,
   wherein said first swirler tube end is configured as an open tube end, said second swirler tube end is configured as a closed tube end, and said swirler tube is arranged inside said catalyst housing such that a sequential flow path is created where all exhaust flowing through said catalyst housing must first pass through said plurality of openings in said swirler tube, through said inner volume of said swirler tube, and by said plurality of blades at said first swirler tube end.

2. The exhaust system assembly as set forth in claim 1, wherein said inner volume of said swirler tube and said first swirler tube end are positioned in fluid communication with said exhaust outlet.

3. The exhaust system assembly as set forth in claim 2, wherein said exhaust outlet includes an exhaust outlet axis and said swirler tube is positioned inside said catalyst housing such that said swirler tube axis is co-axially aligned with said exhaust outlet axis.

4. The exhaust system assembly as set forth in claim 3, wherein said first swirler tube end is arranged in abutting fluid-tight engagement with said exhaust outlet and communicates exhaust from said inner volume of said swirler tube to said exhaust outlet.

5. The exhaust system assembly as set forth in claim 1, wherein said catalyst housing includes a first end wall, a second end wall, and at least one side wall that extends in a longitudinal direction between said first and second end walls, wherein said exhaust inlet is positioned adjacent to said first end wall, and wherein said exhaust outlet is positioned adjacent to said second end wall.

6. The exhaust system assembly as set forth in claim 5, wherein said swirler tube includes an upstream side facing said first end wall of said catalyst housing and a downstream side facing said second end wall of said catalyst housing.

7. The exhaust system assembly as set forth in claim 6, wherein said plurality of openings are arranged only in said downstream side of said swirler tube as perforations and said upstream side of said swirler tube has no openings.

8. The exhaust system assembly as set forth in claim 5, wherein said swirler tube is positioned inside said catalyst housing between said at least one catalyst core and said second end wall.

9. The exhaust system assembly as set forth in claim 5, wherein said second swirler tube end is arranged in abutting fluid-tight engagement with said side wall of said catalyst housing such that exhaust does not pass through said second swirler end.

10. The exhaust system assembly as set forth in claim 1, wherein said swirler tube axis is not co-axially aligned with said injector axis.

11. The exhaust system assembly as set forth in claim 1, wherein each of said plurality of blades includes an axial portion that extends parallel to said swirler tube axis and a distal portion that includes said oblique surface.

12. The exhaust system assembly as set forth in claim 11, wherein said distal portion of each of said plurality of blades has an angled, boomerang-like shape.

13. The exhaust system assembly as set forth in claim 11, wherein said distal portion of each of said blades has an angled, fin-like shape.

14. The exhaust system assembly as set forth in claim 1, wherein said swirler tube includes a series of axially extending fins that are circumferentially spaced about said swirler tube such that said plurality of openings in said swirler tube are arranged between adjacent fins.

15. The exhaust system assembly as set forth in claim 14, wherein each of said axially extending fins are arranged at a pitch angle relative to said inner circumference of said first swirler tube end to induce a vortex inside said swirler tube.

16. The exhaust system assembly as set forth in claim 1, wherein said first swirler tube end includes an outer circumference and said plurality of blades are arranged entirely within said outer circumference of said first swirler tube end such that no part of said plurality of blades extends beyond said outer circumference of said first swirler tube end.

17. An exhaust system assembly comprising:
a catalyst housing including an exhaust inlet and an exhaust outlet;
said exhaust inlet having an exhaust inlet axis and said exhaust outlet having an exhaust outlet axis;
at least one catalyst core positioned inside said catalyst housing;
an emissions sensor positioned in said exhaust outlet for detecting NOx emissions;
a swirler tube positioned inside said catalyst housing, said swirler tube extending about a swirler tube axis that is co-axially aligned with said exhaust outlet axis and that is not co-axially aligned with said exhaust inlet axis; and
a reductant injector positioned on said catalyst housing, said reductant injector having an injector axis that is longitudinally spaced from said swirler tube axis;
said swirler tube including a first swirler tube end, a second swirler tube end opposite said first swirler tube end, a tube wall that extends axially between said first and second swirler tube ends and defines an inner volume of said swirler tube, and a plurality of openings in said tube wall that permit exhaust flow into said inner volume of said swirler tube from said catalyst housing;
said first swirler tube end including an inner circumference and a plurality of blades that extend inward relative to said inner circumference of said first swirler tube end; and
each of said plurality of blades including an oblique surface that is arranged at an oblique angle relative to said swirler tube axis to induce a vortex in exhaust exiting said first swirler tube end,
wherein said first swirler tube end is configured as an open tube end, said second swirler tube end is configured as a closed tube end, and said swirler tube is arranged inside said catalyst housing such that a sequential flow path is created where all exhaust flowing through said catalyst housing must first pass through said plurality of openings in said swirler tube, through said inner volume of said swirler tube, and then by said plurality of blades at said first swirler tube end upon exit through said exhaust outlet.

18. An exhaust system assembly comprising:
a catalyst housing including an exhaust inlet and an exhaust outlet;
at least one catalyst core positioned inside said catalyst housing;
a reductant injector extending into said catalyst housing along an injector axis; and
a swirler tube positioned inside said catalyst housing, said swirler tube extending about a swirler tube axis that is not co-axially aligned with said reductant injector axis;
said swirler tube including a first swirler tube end, a second swirler tube end opposite said first swirler tube end, a tube wall that extends axially between said first and second swirler tube ends and defines an inner volume of said swirler tube, and a plurality of openings in said tube wall that permit exhaust flow into said inner volume of said swirler tube from said catalyst housing;
said first swirler tube end including an inner circumference and a plurality of blades that extend inward relative to said inner circumference of said first swirler tube end; and
each of said plurality of blades including an oblique surface that is arranged at an oblique angle relative to said swirler tube axis to induce a vortex in exhaust exiting said first swirler tube end,
wherein said first swirler tube end is configured as an open tube end, said second swirler tube end is configured as a closed tube end, and said swirler tube is arranged inside said catalyst housing such that a sequential flow path is created where exhaust flowing through said catalyst housing must first pass through said plurality of openings in said swirler tube, through said inner volume of said swirler tube, and then by said plurality of blades at said first swirler tube end upon exit through said exhaust outlet.

\* \* \* \* \*